(12) United States Patent
Zielinski et al.

(10) Patent No.: US 12,731,238 B2
(45) Date of Patent: Sep. 8, 2026

(54) PANORAMIC IMAGES FOR IMPROVED METHANE CAMERA COMMISSIONING, INTERPRETATION, AND REMOTE OPERATION

(71) Applicant: Schlumberger Technology Corporation, Sugar Land, TX (US)

(72) Inventors: Lukasz Zielinski, Arlington, MA (US); Manasi Doshi, Cambridge, MA (US); Christopher Boucher, Lexington, MA (US); Andrew J. Speck, Milton, MA (US); Raphael M. Gadot, Sugar Land, TX (US); Michael Hayes Kenison, Missouri City, TX (US); Gokhan Erol, Fulshear, TX (US); Burc Abdullah Simsek, Sugar Land, TX (US); Francisco Jose Gomez, Oxford (GB); Krzysztof Sitkowski, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/820,566

(22) Filed: Aug. 30, 2024

(65) Prior Publication Data

US 2025/0078240 A1 Mar. 6, 2025

Related U.S. Application Data

(60) Provisional application No. 63/535,656, filed on Aug. 31, 2023.

(51) Int. Cl.

*G06T 7/00* (2017.01)
*G01S 17/89* (2020.01)

(Continued)

(52) U.S. Cl.

CPC ........... *G06T 7/0002* (2013.01); *G01S 17/89* (2013.01); *G06V 10/16* (2022.01); *G06V 20/52* (2022.01);

(Continued)

(58) Field of Classification Search

None

See application file for complete search history.

(56) References Cited

U.S. PATENT DOCUMENTS 5,375,465 A 12/1994 Carlson
6,297,504 B1 * 10/2001 Andreou ................ G01J 3/453 250/339.04

(Continued)

FOREIGN PATENT DOCUMENTS

CN 105067023 A 11/2015
CN 107608009 A 1/2018

(Continued)

OTHER PUBLICATIONS

Wang et al. "CN 115187767A Translation". Oct. 14, 2022. (Year: 2022).*

(Continued)

*Primary Examiner* — Zhihan Zhou
(74) *Attorney, Agent, or Firm* — Kyle R. Miiller

(57) ABSTRACT

Example embodiments provide a method for improved commissioning, interpretation, and automated or remote operation of a methane density camera designed for monitoring of gas emissions. In some embodiments, the method consists of three related but independent steps including commissioning, remote operation, and data interpretation.

20 Claims, 6 Drawing Sheets

(51) Int. Cl.

| | |
|---|---|
| ***G06V 10/10*** | (2022.01) |
| ***G06V 20/00*** | (2022.01) |
| ***G06V 20/52*** | (2022.01) |
| ***G06V 20/70*** | (2022.01) |

(52) U.S. Cl.

CPC .... *G06V 20/70* (2022.01); *G06T 2207/10016* (2013.01); *G06T 2207/10028* (2013.01); *G06T 2207/20104* (2013.01); *G06T 2207/20212* (2013.01)

(56) References Cited

U.S. PATENT DOCUMENTS

| | | | |
|---|---|---|---|
| 10,955,355 B2 | 3/2021 | Kester | |
| 11,525,764 B2 | 12/2022 | Bryning | |
| 11,630,022 B2 | 4/2023 | Hedberg | |
| 2011/0285822 A1* | 11/2011 | Dai | G06T 7/586 348/46 |
| 2012/0265479 A1 | 10/2012 | Bridges | |
| 2014/0067919 A1 | 3/2014 | Tada | |
| 2014/0088442 A1 | 3/2014 | Soykan | |
| 2014/0300886 A1 | 10/2014 | Zogg | |
| 2015/0103178 A1 | 4/2015 | Itoh | |
| 2015/0172545 A1* | 6/2015 | Szabo | H04N 23/698 348/36 |
| 2015/0213697 A1 | 7/2015 | Knox | |
| 2015/0369730 A1 | 12/2015 | Schmidt | |
| 2016/0146696 A1 | 5/2016 | Steele | |
| 2017/0024642 A1 | 1/2017 | Xiong | |
| 2017/0364818 A1 | 12/2017 | Wu | |
| 2018/0039885 A1* | 2/2018 | Albrecht | G01N 33/225 |
| 2018/0218095 A1 | 8/2018 | Basu | |
| 2018/0292286 A1 | 10/2018 | Dittberner | |
| 2018/0364185 A1 | 12/2018 | Asano | |
| 2018/0365522 A1 | 12/2018 | Jiang | |
| 2019/0068879 A1 | 2/2019 | Bao | |
| 2019/0196892 A1 | 6/2019 | Matei | |
| 2019/0285504 A1 | 9/2019 | Muralidhar | |
| 2019/0285600 A1 | 9/2019 | Klein | |
| 2019/0302013 A1 | 10/2019 | Wang | |
| 2019/0333266 A1* | 10/2019 | O'Brien | G06T 15/506 |
| 2019/0340914 A1* | 11/2019 | Israelsen | G01M 3/04 |
| 2020/0011789 A1 | 1/2020 | Sandsten | |
| 2020/0116583 A1* | 4/2020 | Hedberg | G01N 21/3504 |
| 2020/0176088 A1 | 6/2020 | Kanamarlapudi | |
| 2020/0182779 A1 | 6/2020 | Kasten | |
| 2020/0182780 A1 | 6/2020 | Kasten | |
| 2020/0226426 A1 | 7/2020 | Jarquin Arroyo | |
| 2020/0393434 A1 | 12/2020 | Li | |
| 2020/0398959 A1 | 12/2020 | Pomerantz | |
| 2021/0140934 A1 | 5/2021 | Smith | |
| 2021/0156793 A1 | 5/2021 | Leen | |
| 2021/0223169 A1 | 7/2021 | Waxman | |
| 2021/0255157 A1 | 8/2021 | Rashid | |
| 2022/0244127 A1* | 8/2022 | Aubrey | B64U 10/13 |
| 2022/0327708 A1 | 10/2022 | Satish | |
| 2023/0111401 A1* | 4/2023 | Machover | G01N 21/3504 73/23.2 |
| 2023/0169222 A1 | 6/2023 | Wang | |
| 2023/0175914 A1 | 6/2023 | Diven | |
| 2023/0177726 A1* | 6/2023 | Spears | G06T 7/0004 382/100 |
| 2023/0194483 A1 | 6/2023 | Some | |
| 2023/0222271 A1 | 7/2023 | Spackova | |
| 2023/0304982 A1 | 9/2023 | Eichenlaub | |
| 2023/0324430 A1* | 10/2023 | Reed | G01M 3/186 73/170.11 |
| 2023/0326201 A1 | 10/2023 | Rashid | |
| 2024/0200991 A1 | 6/2024 | Salman | |
| 2024/0418693 A1 | 12/2024 | Rashid | |
| 2024/0420311 A1 | 12/2024 | Speck | |
| 2025/0044176 A1* | 2/2025 | Mikhailov | G01M 3/002 |
| 2025/0067858 A1 | 2/2025 | Boucher | |
| 2025/0110007 A1 | 4/2025 | Rashid et al. | |

FOREIGN PATENT DOCUMENTS

| | | |
|---|---|---|
| CN | 108731645 A | 11/2018 |
| CN | 109195132 A | 1/2019 |
| CN | 109614526 A | 4/2019 |
| CN | 111325801 A | 6/2020 |
| CN | 113887044 A | 1/2022 |
| CN | 114329245 A | 4/2022 |
| CN | 114416692 A | 4/2022 |
| CN | 115018327 A | 9/2022 |
| CN | 115187767 A | 10/2022 |
| EP | 0943085 B1 | 3/2004 |
| EP | 2329289 B1 | 9/2013 |
| JP | H06294500 A | 10/1994 |
| JP | H07083786 A | 3/1995 |
| JP | H07140031 A | 6/1995 |
| JP | H07190879 A | 7/1995 |
| JP | H07198523 A | 8/1995 |
| JP | 2996349 B2 | 12/1999 |
| KR | 101473956 B1 | 12/2014 |
| KR | 2015003470 A | 1/2015 |
| KR | 1020160123467 A | 10/2016 |
| KR | 20180041828 A | 4/2018 |
| KR | 1020190058230 A | 5/2019 |
| KR | 102482129 B1 | 1/2023 |
| WO | 2019213280 A1 | 11/2019 |
| WO | 2020018867 A1 | 1/2020 |
| WO | 2020206008 A1 | 10/2020 |
| WO | 2020263693 A1 | 12/2020 |
| WO | 2021067844 A1 | 4/2021 |
| WO | 2021156864 A1 | 8/2021 |
| WO | 2022023226 A1 | 2/2022 |
| WO | 2022051572 A1 | 3/2022 |
| WO | 2022056152 A1 | 3/2022 |
| WO | 2022081717 A1 | 4/2022 |
| WO | 2023108041 A1 | 6/2023 |
| WO | 2023133345 A1 | 7/2023 |
| WO | 2024030523 A1 | 2/2024 |
| WO | 2024030525 A1 | 2/2024 |
| WO | 2024054640 A1 | 3/2024 |
| WO | 2024064113 A1 | 3/2024 |
| WO | 2024155857 A1 | 7/2024 |
| WO | 2024254521 A1 | 12/2024 |

OTHER PUBLICATIONS

Titchener et al. "Single photon Lidar gas imagers for practical and widespread continuous methane monitoring". (Year: 2021).*

Titchener et al. "Single photon Lidar gas imagers for practical and widespread continuous methane monitoring." Applied Energy 306 (2022): 118086. (11 pages).

Saunois, M., et al. (2020), The Global Methane Budget 2000-2017, Earth Syst. Sci. Data, 12, 1561-1623.

Pomerantz A.E. et al., 2022. Present global warming: a justifiable and stable metric for evaluating short-lived climate pollutants. Environmental Research Letters, 17(11), p. 114052. (6 pages).

Cusworth , D.H. et al., 2021. Intermittency of large methane emitters in the Permian Basin. Environmental Science Technology Letters, 8(7), pp. 567-573.

Chakrabarti et al., Sep. 2022. Rapid Detection of Super-Emitters Utilizing an IoT-Enabled Continuous Methane Emissions Monitoring System. In SPE Annual Technical Conference and Exhibition. OnePetro. (6 pages).

Chakrabarti et al., Oct. 2022. Rapid Detection of Methane Super-Emitters Through Advanced Interpretation. In ADIPEC. OnePetro (6 pages).

Potyrailo, R.A. et al., 2020. Extraordinary performance of semiconducting metal oxide gas sensors using dielectric excitation. Nature Electronics, 3(5), pp. 280-289.

Zimmerle, D. METEC Controlled Test Protocol: Continuous Monitoring Emission Detection And Quantification, Energy Institute, Colorado State University. https://energy.colostate.edu/wp-content/uploads/sites/28/2021/03/Continuous-Monitoring-Protocol-R1.0.pdf (31 pages).

Take control of your emissions management programme, downloaded on Dec. 15, 2023 from link https://sensorup.com/methane-emissions-management/ (12 pages).

(56) References Cited

OTHER PUBLICATIONS

BlueSky resources makes sense out of sensors, downloaded on Dec. 15, 2023 from linke https://blueskyresources.com/solutions/ (3 pages).
Yu, L. et al., "Methane leakage source location based on a near-infrared off-axis integrated cavity output spectroscopic ppbv-level sensor and an optimized inverse model", Infrared Physics Technology, 2022, vol. 121, pp. 1-9.
Weidmann, D. et al., "Locating and Quanitifying Methane Emissions by Inverse Analysis of Path-Integrated Concentation Data Using a Markov-Chain Monte Carlo Apporach", ACS Earth and Space Chemistry, 2022, 6(9), pp. 2190-2198.
Ye, W. et al., "Leakage source location based on Gaussain plume diffusion model using a near-infrared sensor", Infrared Physics Technology, 2020, vol. 109, pp. 1-5.
Majumder et al., "Development and Evaluation of Ensemble Learning-based Environmental Methane Detection and Intensity Prediction Models", Dec. 17, 2023, pp. 1-16 (Year: 2023).
Andrews et al., "Quantitative Mapping of Methane Emissions in Oil Gas Facilities", Oct. 16-18, 2023, Society of Petroleum engineers, SPE-214909-MS, pp. 1-10 (Year: 2023).
Imbiriba et al., "Augmented physics-based machine learning for navigation and tracking", 2023, IEEE Transactions on Aerospace and electronic Systems, pp. 1-13 (Year: 2023).
S. R. Hanna, G. A. Briggs, R. P. Hosker, 1982, Handbook on Atmospheric Diffusion, DOE/TIC-11223 (7 pages).
"AERMOD" downloaded from Wikipedia on Jul. 31, 2024 from [https://en.wikipedia.org/wiki/AERMOD], Last Edited Mar. 4, 2022, 2 pages.
Search Report issued in Norwegian Patent Application No. 20230720 on Jan. 23, 2024; 10 pages.
Combined Search and Exam Report issued in United Kingdom patent Application No. GB2409015.1 dated Oct. 8, 2024, 5 pages.
Examination Report issued in Norwegian Patent Application No. 20230720 issued on Dec. 19, 2024, 1 page.
Office Action issued in U.S. Appl. No. 18/480,279 dated Nov. 7, 2023, 13 pages.
Notice of Allowance issued in U.S. Appl. No. 18/480,279 dated Nov. 8, 2024, 26 pages.
Extended Search Report issued in European Patent Application No. 24182656.9 dated Nov. 14, 2024, 6 pages.
International Search Report and Written Opinion issued in the PCT Application No. PCT/US2024/033102 dated Sep. 24, 2024, 10 pages.
Office Action issued in U.S. Appl. No. 18/537,978 dated Mar. 7, 2024, 10 pages.
International Search Report and Written Opinion issued in PCT Application PCT/US2023/083724, dated Apr. 30, 2024 (9 pages).
Notice of Allowance issued in U.S. Appl. No. 18/537,978 dated Aug. 19, 2024, 10 pages.
Notice of Allowance issued in U.S. Appl. No. 18/537,978 dated Jan. 27, 2025, 16 pages.
Extended Search Report issued in United Kingdom Patent Application No. GB2412830.8 dated Jan. 29, 2025, 7 pages.
International Search Report and Written Opinion issued in PCT Application PCT/US2023/033106, dated Jan. 23, 2024 (7 pages).
International Search Report and Written Opinion issued in the PCT Application No. PCT/US2023/029361 dated Nov. 14, 2023, 11 pages.
International Preliminary Report on Patentability issued in the PCT Application No. PCT/US2023/029361 dated Feb. 13, 2025, 7 pages.
International Search Report and Written Opinion issued in the PCT Application No. PCT/US2023/029363 dated Nov. 21, 2023, 10 pages.
International Preliminary Report on Patentability issued in the PCT Appliction No. PCT/US2023/029363 dated Feb. 13, 2025, 6 pages.
International Search Report and Written Opinion issued in the PCT Application No. PCT/US2024/012087 dated May 23, 2024, 11 pages.
International Search Report and Written Opinion issued in PCT Application PCT/US2023/010475, dated May 2, 2023 (11 pages).
International Preliminary Report on Patentability issued in the PCT Application No. PCT/US2023/010475 dated Jul. 25, 2024, 8 pages.
International Search Report and Written Opinion issued in PCT Application PCT/US2023/032307, dated Dec. 26, 2023 (10 pages).
Montazeri, A. et al., "On the Viability of Video Imaging in Leak Rate Quantification: A Theoretical Error Analysis", Sensors (Basel), Aug. 24, 2021; 21 (17):5683. doi: 10.3390/s21175683. PMID: 34502574; PMCID: PMC8434307 (Year: 2021).
Hirst, B. et al., "Locating and quantifying gas emission sources using remotely obtained concentration data", arXiv preprint of Atmospheric Environment, 2013, vol. 74, pp. 141-158.

* cited by examiner

PANORAMIC IMAGES FOR IMPROVED METHANE CAMERA COMMISSIONING, INTERPRETATION, AND REMOTE OPERATION

CROSS-REFERENCE TO RELATED APPLICATIONS

The current application claims priority to U.S. Provisional Patent Application 63/535,656 filed Aug. 31, 2023, the entirety of which is incorporated by reference.

BACKGROUND

Calculating the emission rate of fugitive gases is an important part of detecting and determining the extent of leaks resulting from mining activity. These fugitive gas emissions contribute to greenhouse gas emissions that are harmful to the environment. Many fugitive emissions are the result of loss of well integrity, through poorly sealed well casings, due to geochemically unstable cement. These poorly sealed well casings allow gas to escape through the well itself (known as surface casing vent flow) or via lateral migration along adjacent geological formations (known as gas migration).

Gas imagers scan a finite field of view ("FOV") at a time. To increase the field of view, some solutions include scanning patterns continuously and cyclically, iterating through predefined frames, acquiring images in the predefined frames, and marking the images. In some instances, the images are marked as positive if the imager sees an identifiable plume within the frame. In other instances, the images are marked as negative if no identifiable plume is identified. Each acquisition acts as a standalone observation. In instances using systems where images may be re-centered as well as systems that provide zooming capabilities, upon plume detection, the imager may re-center on an estimated plume origin and acquire an additional frame at a predefined zoom level (same as or different from the original zoom level). Even with optimally selected frames, such scan cycles are prone to false positives that arise from noise. Other problems exist for large plumes that may spread across multiple frames. Such spreading may restrict attribution to sources within these frames, thereby increasing the likelihood of attributing an emission to an incorrect source. The above results in reduced calculation accuracy for determination of the duration of a leak. Other limitations encountered include leak rate quantification accuracy, as well as analysis, showing possible false negatives when the imager sees a portion of the plume but does not see an identifiable plume origin.

With rising concerns around gas emissions (especially greenhouse gases such as methane and carbon dioxide), it is crucial to accurately detect gas emissions along with their source, duration, and emission rate. As a result, a need exists for a gas imaging system that can adapt to real-time detections and changes.

Currently, both acquisition and interpretation of images are based on individual frames, resulting in many interpretation complications, as well as limiting the scope for remote automated system commissioning and operation. Upon installation of the camera at a given site, the field crew has to select the frame coordinates, or bearings, for the camera to view sequentially as the camera scans the facility. Engineers point the camera in a particular direction and adjust the parameters, such as camera heading and zoom level, based on what fits within the frame. Engineers may select viewing angles that are sub-optimal for emission detection. The camera may be pointed too high, missing returns from the horizon, or too low, thereby suffering from excessive reflections and other artifacts. In other instances, the camera may miss an important equipment group altogether. Having a panoramic scan of the entire facility enables the sharing with remote experts, or usage of advisor software, who can then perform better frame selection based on superior understanding of the hardware limitations.

There is a need to provide for capture of panoramic images of emissions sites that will allow for accurate analysis of data.

There is an additional need to provide for a cost effective recordation system that will capture images that may be evaluated from a remote location.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for generating a panorama image for emissions monitoring is disclosed. The method may comprise performing a camera siting at a location to be monitored for emissions. The method may also comprise performing a sequence definition for scan frames to be obtained by the camera. The method may also comprise performing at least two frame acquisitions using the sequence definition and stitching the at least two frames together. The method may also comprise creating the panoramic image from the stitching together of the at least two frames acquired using the sequence definition.

In another example embodiment, a method for analyzing an environment for gaseous effluents at commissioning of a system configured to performed the analyzing is disclosed. The method may comprise obtaining a panorama generated for a site that is to be monitored for the gaseous effluents. The method may also comprise at least one of labeling equipment in the panorama, selecting a set of frame coordinates and zoom levels for the panorama and marking no emission zones in areas of the site where emissions will not occur.

In another example embodiment of the disclosure, a method for analyzing an environment for gaseous effluents during operations of at least one system is disclosed. The method may comprise obtaining a panorama generated for a site that contains the at least one system to be monitored for the gaseous effluents. The method may further comprise labeling equipment in the panorama. The method may further comprise selecting a set of frame coordinates and zoom levels for the panorama. The method may further comprise marking no emission zones in areas of the site where emissions will not occur. The method may further comprise marking high-albedo and high-noise zones within the panorama. The method may further comprise conducting a plume-tracking frame selection of the panorama. The method may further comprise identifying a presence of a plume within the panorama. The method may further comprise performing a screening of the high-albedo and high-noise zones and the plume-tracking frame selection of the panorama. The method may further comprise attributing the presence of the plume-tracking frame selection to an emission source.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are; therefore, not be considered limiting of its scope, for the disclosure may admit to other equally effective embodiments.

DETAILED DESCRIPTION

Figure 1:
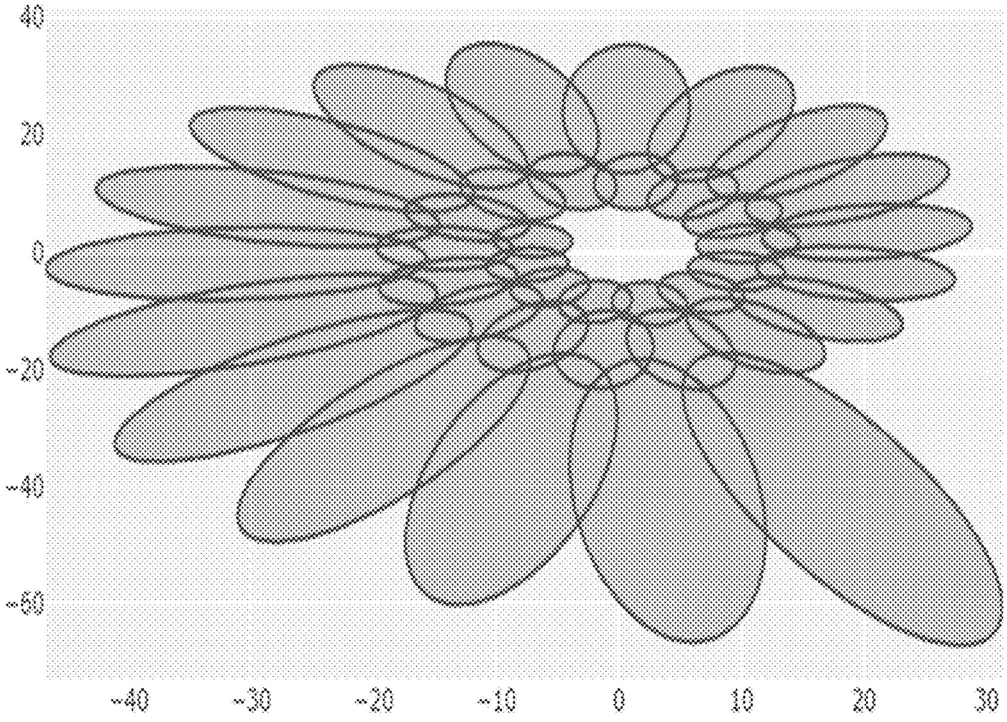
FIG. 1 is an illustration of a golden spiral ground projection of a set of circular frames for a 360×45 degree panorama.

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure.

Thus, the following aspects, features, embodiments, and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers, and/or sections, these elements, components, regions, layers, and/or sections should not be limited by these terms. These terms may be only used to distinguish one element, components, region, layer, or section from another region, layer, or section. Terms such as "first", "second", and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

When an element or layer is referred to as being "on", "engaged to", "connected to", or "coupled to" another element or layer, it may be directly on, engaged, connected, or coupled to the other element or layer, or interleaving elements or layers may be present. In contrast, when an element is referred to as being "directly on", "directly engaged to", "directly connected to", or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Reference will now be made in detail to the present examples, including examples illustrated in the accompanying drawings. Wherever possible, the same reference numbers will be used throughout the drawings to refer to the same or like parts.

In one example embodiment, a camera is used to obtain visual data of emissions for a site. In embodiments, once installed, the camera can be operated remotely in a semi-automated mode, with each frame being screened individually by interpretation software. The interpretation software may be installed on a personal computer, a computer server, or other computing device. The interpretation software may accept data obtained by the camera. The data may be in the form of an image. If the image shows a clear methane plume, the source is attributed to a piece of equipment visible in the frame, a detection event is created, and notification generated. A frame may then be recentered at the location of the highest concentration point in the image, perhaps at an adjusted zoom level, and re-acquired.

The above-described method works well for strong signal, clearly defined, plumes, fully confined within the frame, not obscured by any objects, and set against diffusely scattered background of sufficiently high-albedo. When any of these conditions are not satisfied, because the albedo of the background causes increased image noise, or because a large plume spans several frames, the current interpretation may result in misdetection (a false positive) or a missed detection (a false negative). Both misdetection and missed detection are highly undesirable outcomes, requiring extensive manual image inspection by trained personnel. Aspects of the disclosure significantly reduce the number of incorrect identifications, thereby reducing the need for manual verification. The aspects reduce specialty worker need to manually inspect images as the methods described minimize error.

In aspects of the disclosure, methods are described for the generation of a panorama or a suitable section of a panorama covering the facility of interest by connecting together the images within individual frames acquired by the methane detection camera and any ancillary measurements, such as photon intensity, LiDAR (Laser imaging Detection and Ranging), RGB (Red Green Blue), or others. This may be done at the commissioning stage of the system. In other embodiments, the connecting can be repeated later, as required to reflect and monitor any changes in the camera environment. The connecting may be performed on a periodic basis. Considerations may be taken into account, such as seasonal variability in the weather (e.g., snow/ice buildup, turning foliage, or ground cover) or changes in man-made structures surrounding the camera when the connecting is performed.

In instances of long exposure frames that may take many seconds or minutes to acquire, and which are required for quantitative methane density laser cameras, a first step is to generate a list of frame coordinates, including suitable zoom levels, such that the frames fully cover the desired sector. In this step, the camera may be mounted on a pan-tilt stage capable of rotation and tilting within a certain range, which could be full 360 degrees horizontally and full 180 degrees vertically. Other variations of the above are also possible. This sector, defined as the "default sector" may be the full range of the pan-tilt stage, or the sector could be a subsection of the full range, based on the specific localization of the camera vis-à-vis the facility to be monitored.

In one example embodiment, if the camera is installed in a corner of a square shaped site, the required horizontal sector of the panorama might be 90 degrees. Similar values may be encountered for the vertical range. When the camera is installed far from the potentially emitting equipment, it may not be necessary to include the nearby ground sections in the panoramic scan. In instances of the use of a laser-based imager that relies on reflections of the laser beam off the background, there is no need to include tilts above horizontal, or more generally, above a tilt setting that returns a horizon as determined by the particular camera parameters and facility layout. In some instances, the system may use a customized panorama sub-sector for a particular facility in order to accelerate the commissioning time as the full 360 degree acquisition may take several hours depending on the field of view of the individual frames.

Embodiments of the disclosure may use algorithms for selection of frame coordinates. There are various algorithms that can be used to provide the complete coverage, with sufficient overlap to perform the stitching between frames. A selection process may be used to minimize the number of frames. In embodiments, the algorithm used may depend on the range of pan-tilt angles as well as on the shape of the frames, which need not be square or rectangular but may be circular or have other shapes depending on the specific hardware implementation. For a full 360-180 degree coverage and circular frames with a particular field of view, the current coordinate optimization is analogous to a problem of finding the locations of a given number of electrons or other same-charge particles free to move around the surface of a sphere by minimizing their total electrostatic repulsion energy.

The global minimum energy configuration, for the coordinate optimization, can be obtained by computationally intensive Monte Carlo calculations. Other less intensive approximate solutions may also be used. One such approximate solution is given by the Fibonacci lattice or so-called golden spiral and provides the locations of the frame centers (see FIG. 1). For restricted sectors, fixed by the horizon and facility boundaries, the golden spiral may diverge from optimal. Sector, range specific optimization may be run, again, using the mapping to the well-studied electrostatic energy minimization of a 2D electron gas in one possible embodiment.

If the acquisition of several extra frames is not a key constraint, simple algorithms for close packing circles may be effectively implemented, such as hexagonal packing with sufficient overlap to fill in any hole between them. A hexagonally close packed arrangement of circles, superposed on an equirectangular projection, mapped back into spherical coordinates, results in conical fields of view with increasing overlap at polar angles closer to the zenith. If the desired range of vertical angles does not extend all the way to the zenith (from the horizon to a 45 degree downward angle), the total number of frames may be only marginally greater than that of a configuration that is optimized to reduce overlap. In some embodiments, a more symmetrical appearance of the frames in the hexagonal arrangement may be desirable enough to offset the small increase in acquisition time for these few additional frames. Zoom level or field of view may be another parameter used in optimization. In one embodiment, the figure of merit for the optimization may be the total time required to acquire all the necessary frames. This may be performed under the constraint of achieving sufficiently high resolution of the final stitched image which will improve with denser, longer scans.

Once the frames are acquired, the next step is to stitch them all together to generate the panorama. The stitching algorithm may use any of the available data streams as the main input, whether it is RGB images, or photon intensity images, or LIDAR range, whichever provides the sharpest features for frame-to-frame matching. In other instances, the stitching algorithm can take all the available data streams into account concurrently and optimize the stitching pattern across all of images. In the case of LiDAR range data, the stitching can be done on flattened 2D images using the range as just another function of pan and tilt angle. Alternatively, the stitching may be performed as a 3D point cloud, displaying the true depth of and distances to the surrounding objects. In further embodiments, an overlay of any of the data streams, such as LiDAR and intensity, can be used to convey more information in the same space. As another option, the panoramas from different data streams may be displayed one above another.

Figure 2:
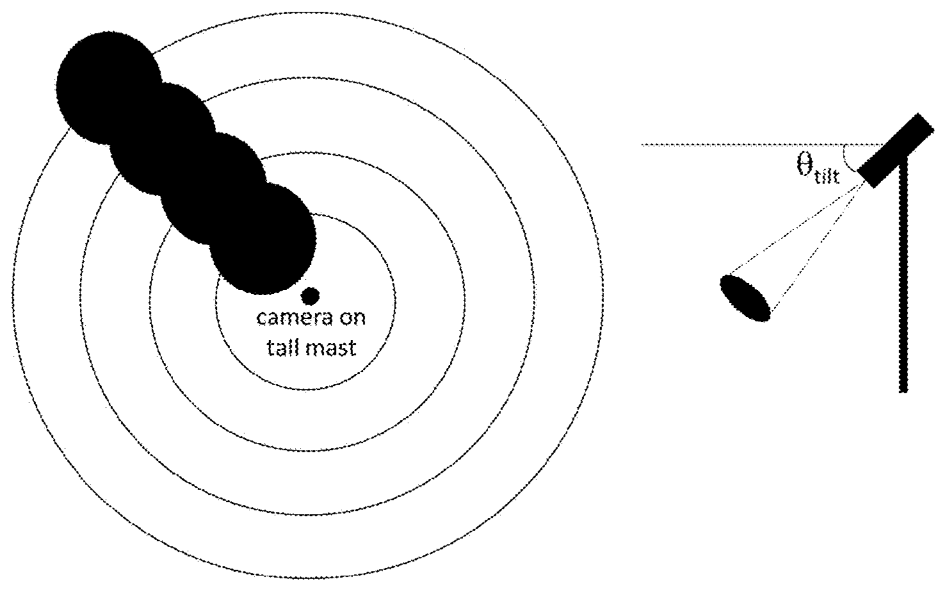
FIG. 2 is an illustration of a field of view at different camera tilt angles.

Once the full panorama or the desired sub-sector of it is generated for each of the available data streams, the result can be displayed in suitable coordinates, which could be the camera pan versus tilt angle or the Cartesian projection of the pan-tilt space onto the flat ground. There are subtleties involved in either approach described above. A fixed field of view, in degrees, will span a different fraction of the circle at different camera tilt angles as illustrated schematically in FIG. 2.

Figure 3:
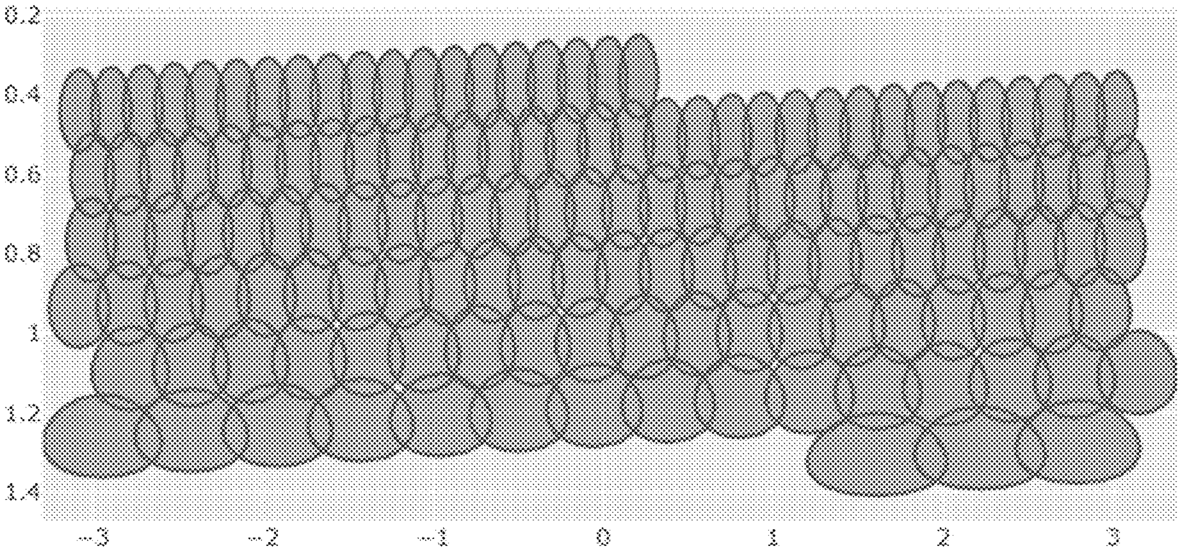
FIG. 3 is an illustration of an example frame sequence projected onto a pan-tilt space.

In instances where the panorama is mapped to pan-tilt angular space and subjected to a map projection, the field of view in a single frame takes on a clearly asymmetric egg shape as the frame deviates farther from the horizon. This is illustrated in FIG. 3, where the full panorama scan pattern based on the golden spiral is shown for one particular fixed field of view.

Figure 4:
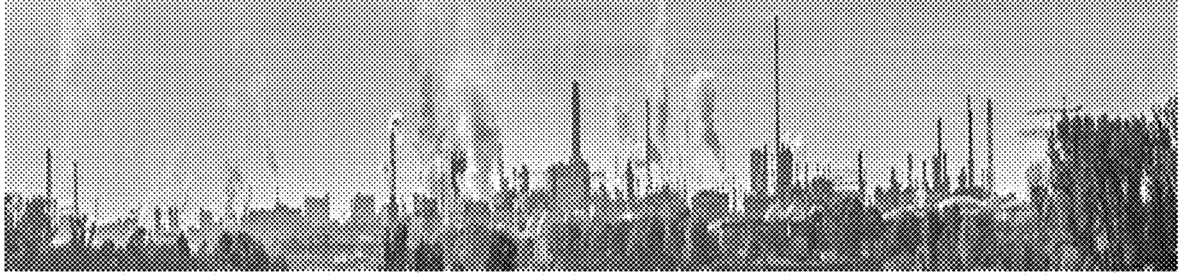
FIG. 4 is an illustration of an example panorama of an industrial plant.

The shape of the field of view frame based on tilt is properly taken into account when stitching the images and displaying the final panorama. FIG. 4 shows an example panorama after stitching all the adjacent frames.

The panorama can then be used to enable a remote commissioning workflow that comprises all or a subset of the following:

(1) Equipment labeling: automated or manual identification and labeling of equipment and structures present in the panorama;

(2) Frame coordinates selection: based on (1), automated or manual selection of frame pan-tilt coordinates and zoom levels for future facility scanning;

(3) No-emission zones: identification of no-emission zones, i.e., regions in the panorama where leaks cannot originate;

(4) High-noise zones: identification of high-albedo zones or zones where noise levels are higher than ambient due to the reflectivity of the surfaces.

Figure 5:
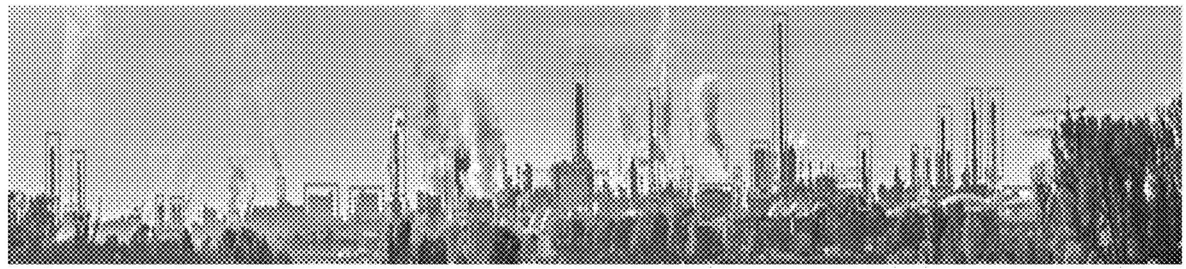
FIG. 5 is an illustration of an example panorama of an industrial plant.

Each of the steps in the workflow may be implemented in different ways. Equipment labeling may be done by manually drawing polygons or other shapes around the various structures of interest and selecting a corresponding label from a list. In other embodiments, computer vision algorithms may be used to suggest the shapes and labels that can then be modified or accepted by a human operator. In still further embodiments, machine learning algorithms can complete the entire process automatically without any manual intervention. Other possibilities exist, such as use of a combination of the above described algorithms. FIG. 5 shows an example outcome of such a process carried out for the panorama from FIG. 4.

Different types of facilities may have different equipment present and thus different sets of labels to mark the equipment. A typical upstream or midstream oil and gas facility might include storage tanks, wellheads or Christmas trees, compressors, flares, separators, pumps, pipes, valves, as well as other equipment, some of which may be housed under a roof of a shed or a barn. All the equipment of interest, in one example, encompassing everything that could potentially leak or emit methane, would then be identified and marked on the panorama.

Figure 6:
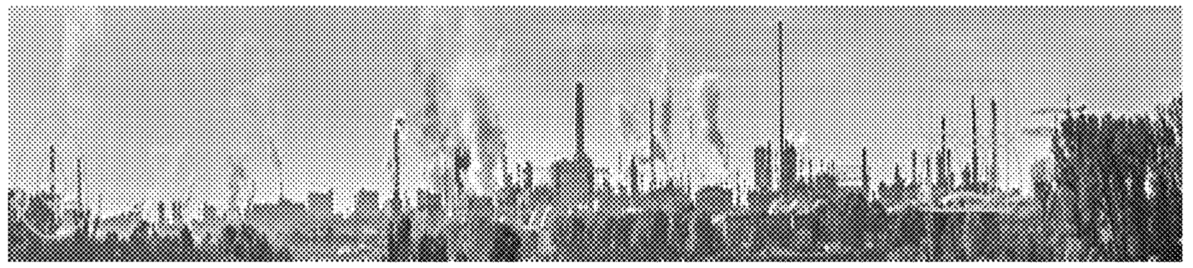
FIG. 6 is an illustration of an example panorama of an industrial plant.

The selection of pan-tilt coordinates and zoom levels for the automated facility scans may be done automatically or manually, or in some combination thereof. Based on the likelihood of a particular piece of equipment developing a leak and based on the understanding of where the plume would form, the frames may be selected to ensure the detection of such an emission event. FIG. 6 shows an example of a manual frame selection process, whereby the skilled operator indicates (e.g., clicks on) the particular equipment, and the software draws the corresponding field of view (e.g., around the point clicked) for the particular zoom level. Another implementation is possible wherein the operator draws the outline of the region to be monitored and has the software suggest the frame or multiple frames at the desired zoom level that would cover the indicated region. A snapshot of that process is also shown in FIG. 6.

The automatically or manually selected frames and the corresponding pan-tilt coordinates and zoom levels would then be saved into a parameter file used to operate the camera for future automated facility scanning.

Figure 7:
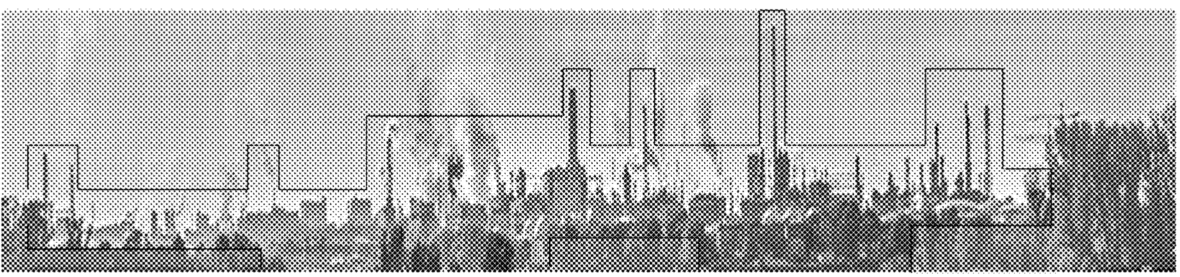
FIG. 7 is an illustration of an example panorama of an industrial plant illustrating leak source exclusion zones.

Identification of no-emission zones would be executed in a similar manner, by indicating the areas from which a leak cannot originate. An example is shown in FIG. 7.

Figure 8:
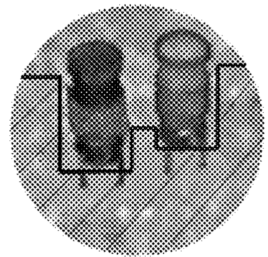
FIG. 8 is an illustration of a gas density and intensity image.

The identification of high-noise zones may require use of a methane density image. The identification can be achieved using a return photon intensity image or possibly on the overlay of the methane density on another image, for example, a photon intensity image, as shown in FIG. 8. FIG. 8 shows an example of marking a high-albedo or high-noise zone within a single frame overlaying methane density on photon intensity. The same process could be followed for a full panorama, marking off the zones with high potential noise levels to be used in future data processing.

Once camera commissioning is complete, the automated operation stage begins. The panorama will be featured in several ways. First, it may be used during periodic quality control checks, to make sure the frames acquired during continuous operation are consistent with the panorama acquired at commissioning. This could be accomplished by overlaying the acquired single frame onto the pan-tilt space panorama of the corresponding quantity (e.g., LiDAR, photon intensity, methane density, or RGB). Deviations could signal mechanical failure of the pan-tilt stage or shifting or leaning of the mounting of the camera, or changes in the albedo or reflectivity of the background surfaces, or degradation of the camera performance (e.g., shift in photon frequency, lower generated photon levels, lost coherence, etc.). Any of these conditions could adversely affect the camera performance and pose problems during interpretation.

During the data processing and interpretation stage, the panorama is used in multiple steps. If a methane plume is detected in any given frame, the plume needs to be attributed to a particular piece of equipment. If the emitting equipment is not in the frame, the attribution algorithm may disregard the possibility of certain out-of-frame equipment groups being the source of the emission and make an incorrect attribution. Displaying the plume on the full panorama and performing the attribution with the full view of all adjacent infrastructure greatly improves the performance of the algorithm if automated; or makes it easier for a human operator to make a "best call" on the likely origin of the emission.

Figure 9:
FIG. 9 is an illustration of an example panorama of an industrial plant illustrating a gas plume.

Another application of the disclosure is when the plume is large and extends beyond the confines of the individual frame, as shown in FIG. 9. Based on the acquisition automation implementation, the frame will follow the plume along, perhaps along the wind direction or perhaps along the gradient of methane density. Multiple frames of the same plume would be acquired, sometimes overlapping. Frame-by-frame interpretation in such a case is very difficult as the pan-tilt coordinates change, and nearby equipment may be similar and hard to distinguish.

In one embodiment, stitching these plume-tracking frames and overlaying them on the panorama will make both the manual and automated emission attribution and quantification easier, more efficient, more robust, and more accurate.

Another use case is the utilization of the earlier designated high-albedo or high-noise regions. Such regions might result in false positives due to the higher likelihood of spurious signal spikes that might be interpreted as an emission. There may also be a systematic bias or positive offset in such high-albedo regions, incorrectly registering as a genuine signal. False positives are a big challenge for methane detection systems. The frames containing such high-noise/high-albedo regions might be flagged for more scrutiny in a case of a positive detection event. In some instances, the signal level threshold for detection could be increased for such frames. In some instances, just the high-noise regions within the whole panorama could have an adjusted threshold for detection in case the plume appeared to originate there. In some instances, noise distributions for each local region could be computed from the original panorama and locally used as a metric for detection confirmation.

In addition to the high-noise and high-albedo regions corrections, mentioned above, all the frames can be corrected based on the background noise levels. While these measures could in principle be performed on a frame-by-frame basis, more advanced acquisition automation such as plume tracking or adaptive zooming would benefit from a full background panorama.

Figure 10:
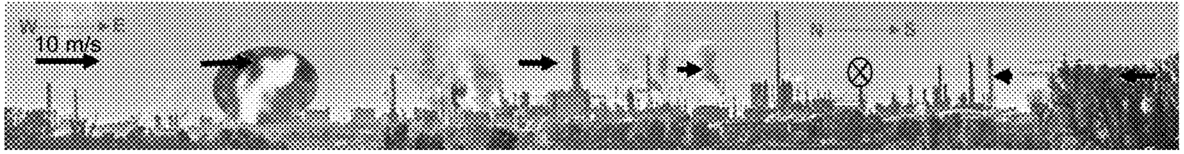
FIG. 10 is an illustration of an example panorama of an industrial plant illustrating a gas plume.

Another aid in interpretation, whether manual or automated, is displaying both the plume and the wind direction and speed on the panorama, if the weather information is available. This can be very helpful as the apparent wind direction will shift when projected on the panoramic view, thus resulting in a different plume shape. This could be accomplished by showing arrows to indicate wind direction, as projected on the panorama plane, with the arrow length corresponding to the wind speed. Note that in this representation, the arrow will be the longest at the point where the wind direction is tangent to the panorama plane. In other locations, the length and direction of the arrow will represent the projection of the wind vector onto the panorama plane at that point. Wind into the page can be indicated by a cross in a circle and out of the page by a dot inside a circle, or by any other convention. An example is shown in FIG. 10, longer arrows depict faster wind speeds.

Any other wind representation along the panorama space can be implemented using one of a wide range of 3D visualization techniques to represent the direction and magnitude of a vector in a 2D space. In the case in which 3D point clouds are used to generate the panorama, the wind can be represented as an actual arrow in 3D space. As another example, the panorama could be used for manual frame selection. If methane imaging of a particular piece of equipment was of interest at any moment, whether or not included in the regular facility scan sequence, due to some episodic activity occurring in that area, then the panorama could enable a quick and easy coordinate selection. This could be implemented by clicking on the panorama at the location of the desired center of the frame, which would output the pan-tilt coordinates required to direct the camera to point in that specific direction. In embodiments, this process may be automated such that in the manual mode the click itself would direct the camera to point at the specific location and perform the acquisition without the need to output and enter the pan-tilt coordinates. The desired zoom level may also be selected based on the coverage area for each zoom level displayed directly on the panorama, as indicated on the left hand side of FIG. 6.

Alternatively, a whole region of interest to be scanned could be drawn or otherwise indicated directly on the panorama, whereupon the software would recommend the frames needed for the acquisition; the frames would then be acquired, stitched, and displayed for review. A further alternative of the disclosure is to use the 3D point cloud data taken for the panorama to predict what would be viewed for a given set of pan-tilt coordinates and display this to a user to ensure an optimum choice prior to sending a command to the camera.

Figure 11:
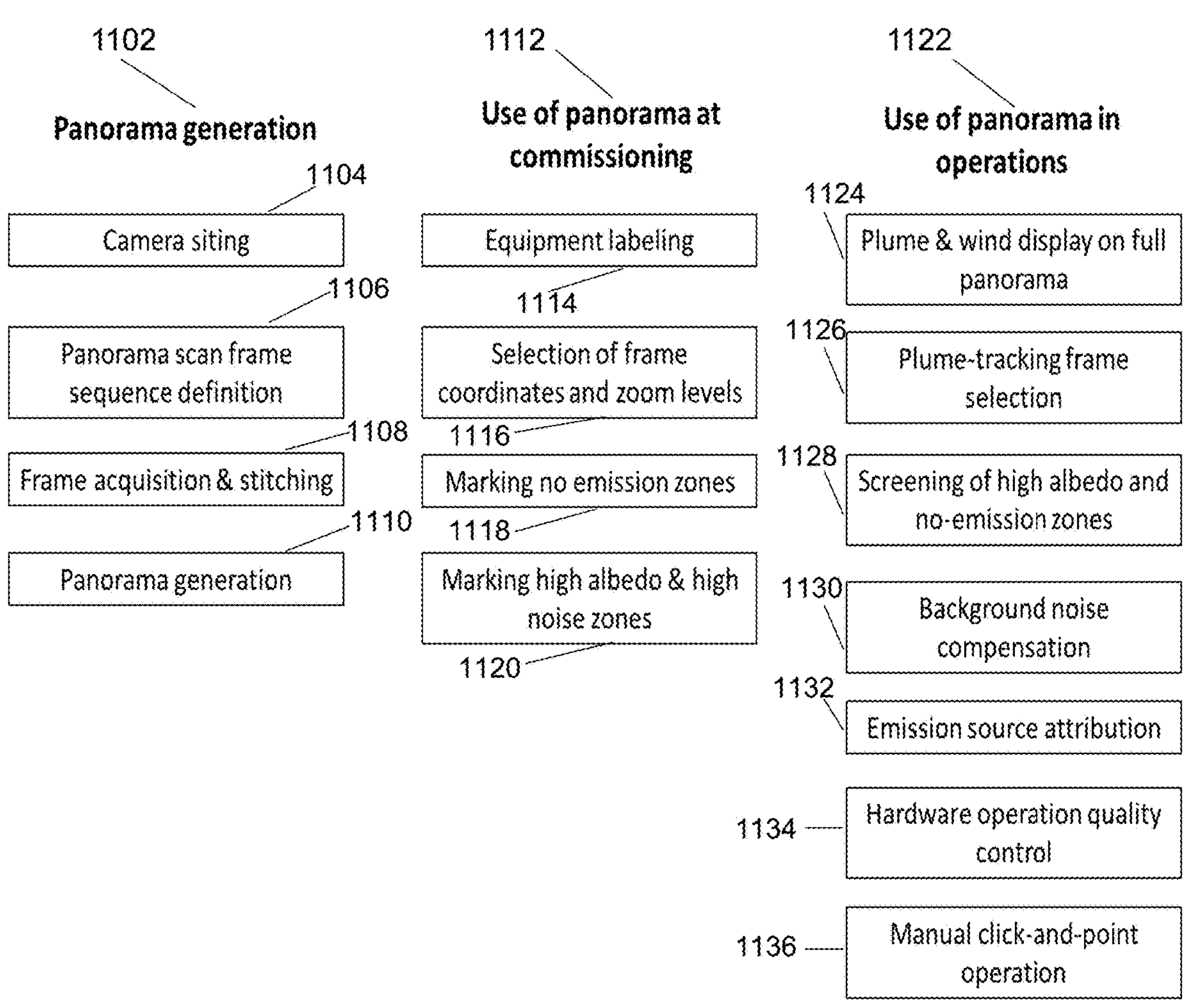
FIG. 11 is an example method for generation of panorama image.

FIG. 11 illustrates the steps required for panorama generation as well as during commissioning and remote operation. Referring to FIG. 11, panorama generation 1102 has individual elements of performing a camera siting 1104, performing a panorama scan frame sequence definition 1106, performing a frame acquisition and stitching 1108 and performing an end-result panorama generation 1110.

The panorama generated at 1110 may be used at a commissioning 1112. The use at the commissioning may include equipment labeling 1114, selecting of frame coordinates and zoom levels 1116, marking of no emission zones 1118, and marking of high-albedo and high-noise zones 1120. The use of the panorama in operations 1122 may include plume and wind display on full panorama 1124, plume tracking frame selection 1126, screening of high-albedo and no-emission zones 1128, background noise compensation 1130, emission source attribution 1132, hardware operation quality control 1134, and manual click and point operation 1136.

The described workflow/method disclosed can be applied to any data stream that provides image frames of methane density and any ancillary measurements such as range or intensity or RGB (visible frequency band photography).

Example embodiments of the claims are recited. The disclosure should not be considered to be limited by the recited features. In one example embodiment, a method for generating a panorama image for emissions monitoring is disclosed. The method may comprise performing a camera siting at a location to be monitored for emissions. The method may also comprise performing a sequence definition for scan frames to be obtained by the camera. The method may also comprise performing at least two frame acquisitions using the sequence definition and stitching the at least two frames together. The method may also comprise creating the panoramic image from the stitching together of the at least two frames acquired using the sequence definition. performing a camera siting at a location to be monitored for emissions. The method may further comprise performing a sequence definition for scan frames to be obtained by the camera. The method may further comprise performing at least two frame acquisitions and stitching the at least two frames together using the sequence definition. The method may further comprise creating the panorama image from the stitching of the at least two frames together using the sequence definition.

In another example embodiment, the method may be performed wherein the emissions monitoring is at least one of methane emissions, carbon dioxide emissions, greenhouse gas emissions, and hydrocarbon emissions.

In another example embodiment, the method may be performed wherein the stitching of the at least two frames together using the sequence definition is performed using a computing apparatus.

In another example embodiment, the method may be performed wherein the at least two frame acquisitions include at least one of red, green, blue images, photon intensity images, and LiDAR images.

In another example embodiment, the method may be performed wherein a selection of the at least one of red, green, blue images, photon intensity images, and LIDAR images is based upon a desired resolution.

In another example embodiment, the method may further comprise obtaining data related to an ancillary measurement prior to the stitching and using the obtained data related to the ancillary measurement and the frame acquisitions in the stitching.

In another example embodiment, the method may be performed wherein the ancillary measurement includes at least one of a photon intensity and LiDAR measurements.

In another example embodiment, a method for analyzing an environment for gaseous effluents at commissioning of a system configured to performed the analyzing is disclosed. The method may comprise obtaining a panorama generated for a site that is to be monitored for the gaseous effluents. The method may also comprise at least one of labeling equipment in the panorama, selecting a set of frame coordinates and zoom levels for the panorama and marking no emission zones in areas of the site where emissions will not occur.

In another example embodiment, the method may be performed wherein the labeling of the equipment in the panorama includes at least one of labeling at least one stack, emissions control device, tank, and structure within the panorama.

In another example embodiment, the method may further comprise analyzing the panorama for the gaseous effluents and when the analyzing of the panorama for the gaseous effluents indicates a presence of gaseous effluents in at least one of a high-albedo and high-noise zone, reanalyzing the presence of the gaseous effluents in the at least one high-albedo and high-noise zone.

In another example embodiment, the method may further comprise measuring a wind speed for the panorama.

In another example embodiment, the method may further comprise notating the wind speed on the panorama.

In another example embodiment, the method may further comprise marking high-albedo and high-noise zones within the panorama.

In another example embodiment of the disclosure, a method for analyzing an environment for gaseous effluents during operations of at least one system is disclosed. The method may comprise obtaining a panorama generated for a site that contains the at least one system to be monitored for the gaseous effluents. The method may further comprise at least one of the following: labeling equipment in the panorama, selecting a set of frame coordinates and zoom levels for the panorama, marking no emission zones in areas of the site where emissions will not occur, conducting a plume-tracking frame selection of the panorama, identifying a presence of a plume within the panorama, performing a screening of the high-albedo and high-noise zones and the plume-tracking frame selection of the panorama and attributing the presence of the plume-tracking frame selection to an emission source.

In another example embodiment, the method may further comprise determining an emission rate for the plume.

In another example embodiment, the method may further comprise comparing the emission rate for the plume to a standard and altering the emission rate for the plume when the standard is exceeded.

In another example embodiment, the method may be performed wherein the altering of the emission rate for the plume includes performing a hardware operational control of emission equipment.

In another example embodiment, the method may be performed wherein the altering of the emission rate for the plume includes performing a hardware operational control of a production process.

In another example embodiment, the method may further comprise recording data for the analyzed data.

In another example embodiment, the method may further comprise reviewing one of recorded data and analyzed data through a computer configured with a click and point operation.

In another example embodiment, the method may further comprise marking high-albedo and high-noise zones within the panorama.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for analyzing an environment for gaseous effluents during operations of at least one system comprising:

obtaining a panorama generated for a site that contains the at least one system to be monitored for the gaseous effluents;

selecting a set of frame coordinates and zoom levels for the panorama based at least on a likelihood of equipment developing a leak, a presence of a plume, or both;

storing the set of frame coordinates and zoom levels as parameters for subsequent image capture; and obtaining at least one subsequent panorama at least in part using the parameters for subsequent image capture.

2. The method according to claim 1, further comprising: determining an emission rate for the plume.

3. The method according to claim 2, further comprising: comparing the emission rate for the plume to a standard; and altering the emission rate for the plume when the standard is exceeded.

4. The method according to claim 3, wherein the altering of the emission rate for the plume includes performing a hardware operational control of emission equipment.

5. The method according to claim 3, wherein the altering of the emission rate for the plume includes performing a hardware operational control of a production process.

6. The method according to claim 1, further comprising: recording data for analysis.

7. The method according to claim 6, further comprising: reviewing one of recorded data and analyzed data through a computer configured with a click and point operation.

8. The method according to claim 1, further comprising: marking high-albedo and high-noise zones within the panorama.

9. The method according to claim 1, further comprising: marking no emission zones in areas of the site where emissions will not occur.

10. The method according to claim 1, further comprising: superimposing, on the panorama, an indicator of wind speed and wind direction associated with the plume.

11. The method according to claim 1, further comprising: conducting a plume-tracking frame selection of the panorama;

performing a screening of high-albedo and high-noise zones and the plume-tracking frame selection of the panorama; and attributing the presence of the plume-tracking frame selection to an emission source.

12. A method for analyzing an environment for gaseous effluents during operations of at least one system comprising:

obtaining, using a default set of frame coordinates and zoom levels, a panorama generated for a site that contains the at least one system to be monitored for the gaseous effluents;

selecting an updated set of frame coordinates and zoom levels for the panorama based at least on a likelihood of equipment developing a leak, a presence of a plume, or both;

obtaining, using the updated set of frame coordinates and zoom levels, at least one subsequent panorama using the parameters for subsequent image capture.

13. The method of claim 12, wherein the updated set of frame coordinates and zoom levels are selected according to an algorithm that minimizes a number of captured frames.

14. The method of claim 12, wherein the updated set of frame coordinates and zoom levels are selected using a Monte Carlo calculation.

15. The method of claim 12, further comprising:

marking, on the panorama, no emission zones in areas of the site where emissions will not occur.

16. The method according to claim 12, further comprising:

superimposing, on the panorama, an indicator of wind speed and wind direction associated with the plume, wherein a size of the indicator is proportional to the wind speed.

17. The method according to claim 12, further comprising:

conducting a plume-tracking frame selection of the panorama;

performing a screening of high-albedo and high-noise zones and the plume-tracking frame selection of the panorama; and attributing the presence of the plume-tracking frame selection to an emission source.

18. The method according to claim 12, further comprising:

determining an emission rate for the plume.

19. The method according to claim 18, further comprising:

comparing the emission rate for the plume to a standard; and altering the emission rate for the plume when the standard is exceeded.

20. The method according to claim 19, wherein the altering of the emission rate for the plume includes performing a hardware operational control of emission equipment.

* * * * *